US007028933B2

(12) United States Patent
Maiz

(10) Patent No.: US 7,028,933 B2
(45) Date of Patent: Apr. 18, 2006

(54) LIVESTOCK FOOD PROCESSING MIXING MACHINE

(75) Inventor: Javier Villarreal Maiz, Torreon (MX)

(73) Assignee: Tormex Industrias, S.A. de C.V., (MX)

( * ) Notice: Subject to any disclaimer, the term of this patent is extended or adjusted under 35 U.S.C. 154(b) by 256 days.

(21) Appl. No.: 10/746,480

(22) Filed: Dec. 24, 2003

(65) Prior Publication Data

US 2005/0087636 A1    Apr. 28, 2005

(30) Foreign Application Priority Data

Aug. 8, 2003    (MX) .................... PA/u/2003/000195

(51) Int. Cl.
| | |
|---|---|
| *B02B 5/02* | (2006.01) |
| *B02B 3/06* | (2006.01) |
| *B02C 1/08* | (2006.01) |
| *B01F 7/00* | (2006.01) |
| *A23N 17/00* | (2006.01) |

(52) U.S. Cl. ................ 241/101.8; 241/243; 241/260.1; 366/319; 366/603; 366/299; 366/166.1

(58) Field of Classification Search ............. 241/101.8, 241/243, 260.1, 239, 221, 198.1, 260; 366/319, 366/323, 603, 299, 309, 166.1
See application file for complete search history.

(56) References Cited

U.S. PATENT DOCUMENTS

| | | | | |
|---|---|---|---|---|
| 2,865,416 | A | * | 12/1958 | Hetteen ...................... 241/238 |
| 3,948,451 | A | * | 4/1976 | Pecis .......................... 241/154 |
| 4,298,289 | A | * | 11/1981 | Walley ........................ 366/196 |
| 4,597,672 | A | * | 7/1986 | Neier et al. .................. 366/186 |
| 4,756,626 | A | * | 7/1988 | Neier .......................... 366/279 |
| 4,896,970 | A | * | 1/1990 | Schuler ....................... 366/296 |
| 4,951,883 | A | * | 8/1990 | Loppoli et al. ........ 241/101.762 |
| 5,143,310 | A | * | 9/1992 | Neier ...................... 241/101.8 |
| 5,967,433 | A | * | 10/1999 | O'Neill et al. ........... 241/101.2 |
| 6,007,008 | A | * | 12/1999 | Neier ...................... 241/101.8 |

* cited by examiner

*Primary Examiner*—Faye Francis
(74) *Attorney, Agent, or Firm*—Leydig, Voit & Mayer, LTD

(57) ABSTRACT

A mixing machine consists of a hopper having a main chamber within its housing with a rotary member, a secondary chamber having a bottom worm conveying the material from one end of the mixing machine to the other end thereof, until collapsing with a loop found on its front portion and generating a material bubble; an upper worm to remove the material bubble and carrying it up to the middle part of the machine. At the middle part of the machine, the material is forced by a loop system having an upper worm to move towards the rotor area, such that the material is actually moving towards the back portion of the machine, completing a mixing cycle. The upper worm has from the middle of its axis, a plurality of discs on which peripheral edge of each disc is mounted a series of exchangeable knives placed on a loop arrangement, which are passed through a counterplate, and which shows a series of exchangeable knives placed at the bottom part of the material collector chut, so when the upper worm discs plurality is rotating, it allows both, humid and dry fibers be efficiently crushed and/or ground and besides added to the other several common ingredients a unique and highly qualified mixing is achieved.

4 Claims, 5 Drawing Sheets

LIVESTOCK FOOD PROCESSING MIXING MACHINE

FIELD OF THE INVENTION

The present invention relates to a livestock food mixing machine. More specifically, the present invention is related to a system that ensures a better mixing and grinding of food for livestock in a shorter time.

BACKGROUND OF THE INVENTION

Fodder, pasture, and grains, among others, are common livestock food components, that can be used alone or mixed and which constitute the reason of the existence of several types of mixing machines.

There are several mixing devices, which mixing technique consists basically of a bottom chamber for moving the material from the back portion to the front portion of said machine, through a worm, striking said material with a reverse loop at the discharge height; thus resulting in a material bubble. Said bubble is removed by a superior worm that carries the material to the back machine portion and in such way that closes the mixing cycle.

Mixing techniques that are closer to our invention are previously disclosed by the following United States Patents: U.S. Pat. No. 2,865,416 (Hetteen), published on Dec. 23, 1958; U.S. Pat. No. 4,951,883 (Loppoli), published on Aug. 28, 1990 and U.S. Pat. No. 5,967,433 (O'Neil), published on Oct. 19, 1999.

Where the U.S. Pat. No. 2,865,416 discloses a straw trimmer, which is mainly comprised of a plurality of trimming bars mounted on a rotary axis and circumferentially placed on an equidistant form. Likewise, said trimmer has a plurality of stationary blades with a triangular configuration placed upon an adequate holder, each blade has two cutting edges, such that can cut said relatively resistant material and relatively fragile materials.

U.S. Pat. No. 4,951,883 discloses a spreader-mixer-shredder towing car, particularly for cylindrical and prismatic shape fodder, hay and grass bales which comprises an enlarged vessel essentially in the form of a metal-sheet hopper. Two bottom rotary worms placed adjacently, and two spaced upper rotary worms respectively longitudinally provided on each hopper. Each one of the bottom worms is actually supported by a long diameter axis. A plurality of blades is strictly associated to the external loop edge on each bottom worm.

Likewise, said patent mentions a plurality of triangular prongs which are placed on each one of the wedge elements edges and blades provided and the upper portions of the vessel bottom on its side, where it is reached by blades during bottom worms rotation. Triangular prongs adequately border the external worms edge and the flat portion between the prongs border the tearing blade.

Finally, U.S. Pat. No. 5,967,433 discloses a device for supplying and mixing food such as hay, straw and similar, which includes a mixing compartment and a supplying compartment. A mixing rotor which is rotary on the mixing compartment to mix livestock food and the worm to supply within the compartment. A plurality of first blades radially extending from the rotor mixing vanes and cooperates with the plurality of second blades mounted on the mixing compartment base to cut the fibrous material of livestock food in relatively short lengths while the mixing rotor is rotating.

But none of said mixing machines offer what the market demands now a days, which is to incorporate hay, grasses and fodder with long humid fibers, which could be quickly and efficiently ground within same mixer. Generally, common failures in the mixing machines lies on the use of these long humid fibers that due to the lack of user control are incorporated into these mixtures, tangling up within the worms until damaging the equipment.

There exists the need to be able to incorporate long, humid and dry fiber materials, and that the mixing machine could be able to grind or crush said material promptly and efficiently; this is, without increasing mixing times and without power requirements and failure causes.

BRIEF SUMMARY OF THE INVENTION

The main object of the present invention is to offer a livestock food mixing machine having the capacity to mix different ingredients or materials independently from their size, consistence or humidity, on a quicker and efficient manner, and at the same time having the capacity to efficiently crush and/or grind ingredients having long fibers, independently if they are dry or humid, and being aware not to alter mixing times, good mixture quality, low power requirements, low maintenance rates and low cost, since the above will result in cost savings for livestock food products farmers and stockbreeders, reaching a higher competitiveness.

The present invention is related to a mixing machine which basically comprises a hopper, that has a main chamber within its housing, with a rotary member (rotor), where at said rotor ends there are cleaning elements for sweeping the floor and taking up the material, by feeding a secondary chamber, which is located in parallel adjacent to the main chamber, where said secondary chamber has a bottom worm conveying the material from one end of the mixing machine to the other end thereof, until collapsing with a loop found on its front portion and generating a material bubble; an upper worm to remove the material bubble and carrying it up to the middle part of the machine. At the middle part of the machine, the material is forced by a loop system having an upper worm to move towards the rotor area, such that the material is actually moving towards the back portion of the machine, completing a mixing cycle.

On the other hand, this same upper worm has a discs system mounted on a spiral arrangement, which in turn has exchangeable knives strategically placed on the peripheral portion thereof. Said knives are passed through a counterplate, which is also equipped with exchangeable knives placed at the bottom of a material-collector chute. This design allows that both, humid and dry fibers be efficiently ground and/or crushed and besides other several common ingredients to be used, a unique and highly qualified mixing is achieved.

Each inner member the mixing machine has is actuated through actuating mechanisms, such as chains, sprockets, etc. Where the motor source is through a conventional or tractor vehicle.

BRIEF DESCRIPTION OF THE DRAWINGS

Features, objects and advantages of the present invention, can be understood from the specification determined by the following drawings, where similar reference characters are correspondingly identified in all drawings, where.

DETAILED DESCRIPTION OF THE INVENTION

Figure 1:
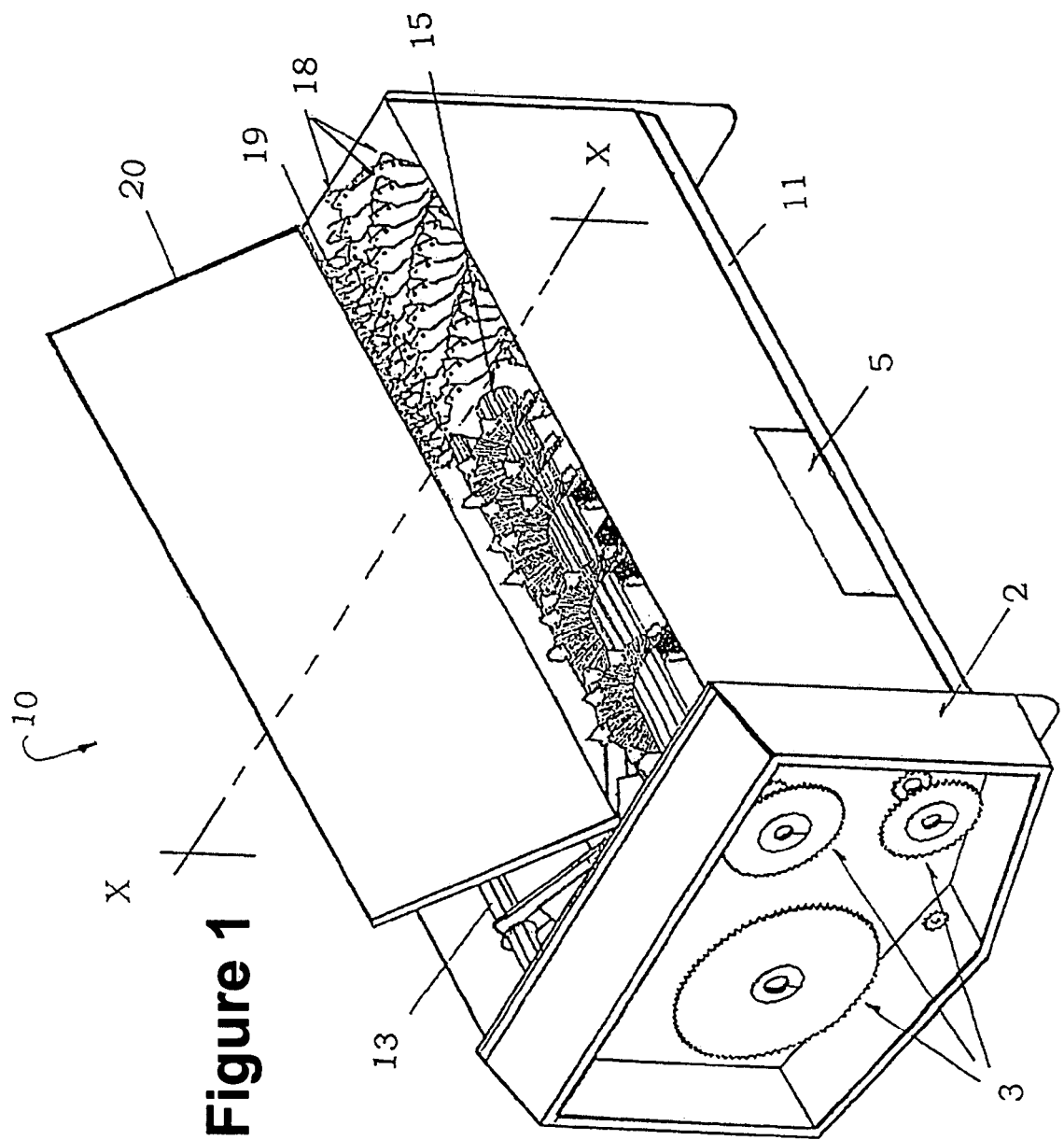
FIG. 1 is a right side perspective view of the mixing machine hereof.

Firstly, it is important to show that there are several mixing system components similar to those of the present invention, that have been mentioned before; this is, this mixing machine has a hopper 11 that can be mounted upon a chassis (not illustrated) and that in turn can be towed through conventional means, such as a tractor, a vehicle, etc., said hopper 11 shows on its upper end, a housing 2 where on its inner part has a rotary gear system, where said system is mainly based on sprockets and chains, see FIG. 1, where only sprockets 3 by themselves are illustrated, in order to visualize the arrangement of said gear system, since for those skilled in the art it is easy to understand said system. This gear system is accessed through a removable cover lid 4 (see FIG. 5); where the gear system transmits the rotary movement for both, rotor 13 as well the pair of worms 15,16 located inside the hopper 11, to complete the homogeneously mixing of different materials used for feeding livestock. Within said mixing machine there is also a gateway 5, where the already mixed materials are discharged. Said gateway 5 can be moved either manually or through hydraulic means (not illustrated) in order to speed up the distribution of the livestock food.

Figure 2:
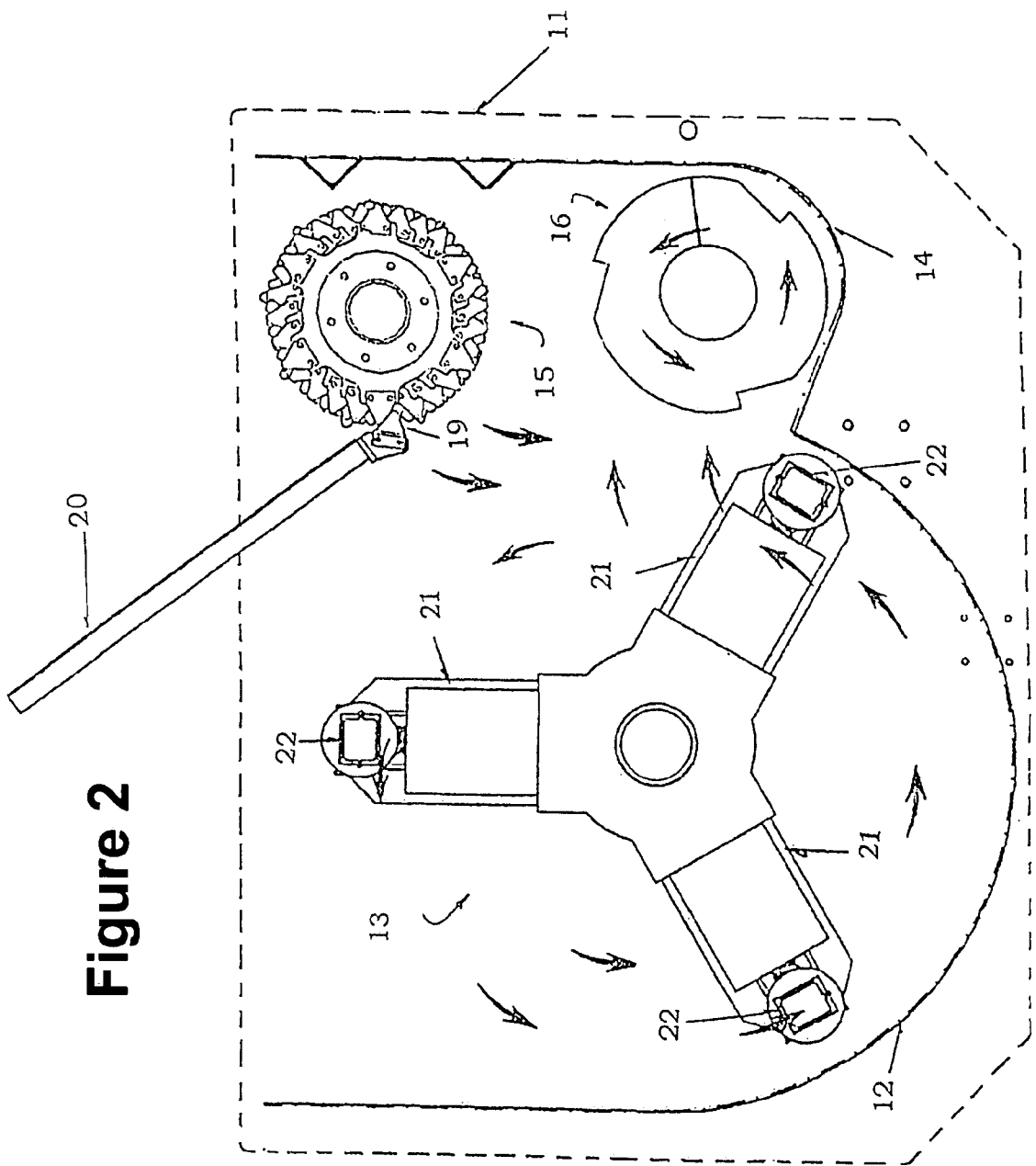
FIG. 2 is a cross-sectional cut taken along the line X—X of FIG. 1, where the present invention mixing machine inventive portions can be seen.
Figure 3:
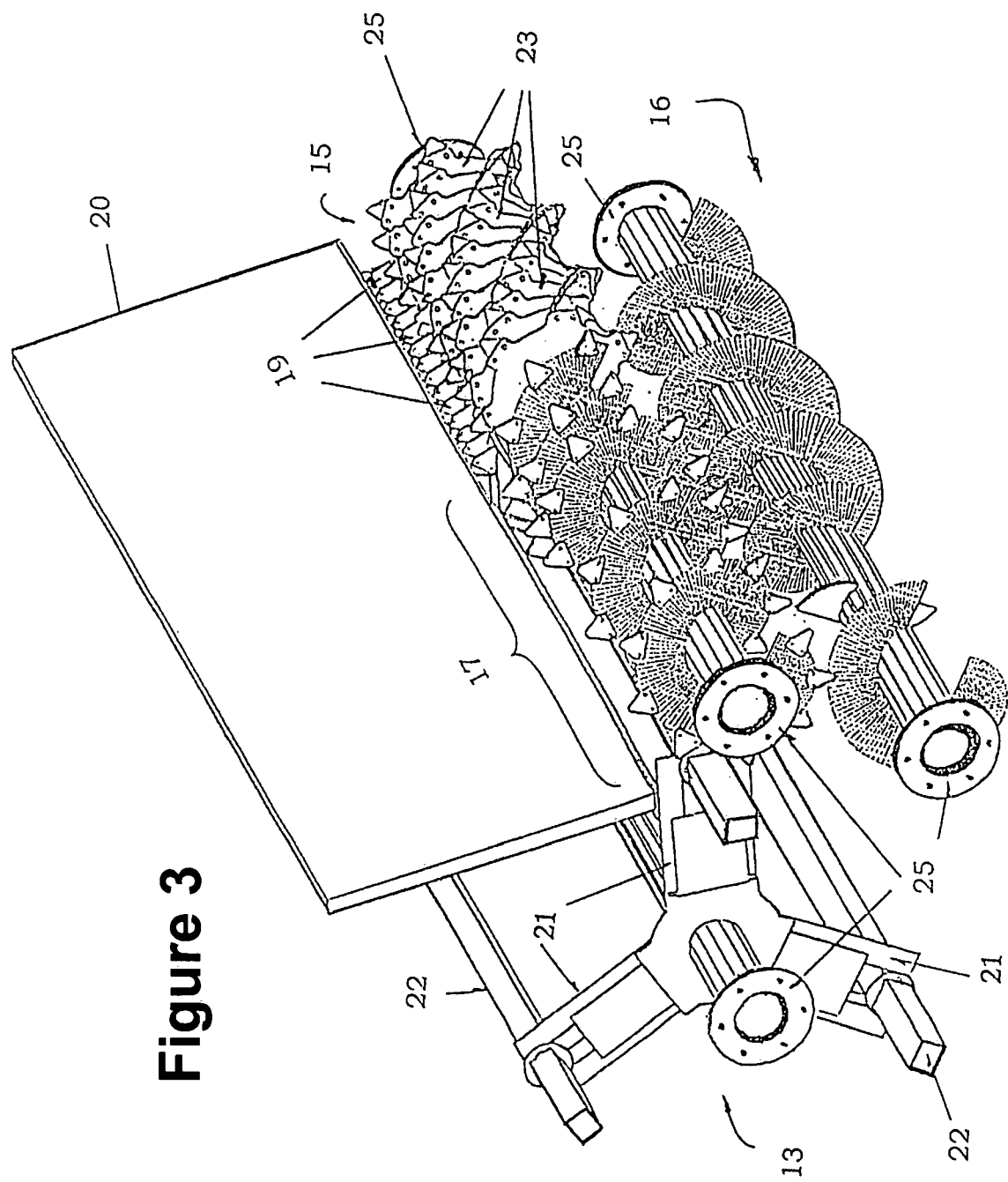
FIG. 3 is a perspective view of the mill system according to the present invention.

According to FIGS. 1 to 3, a mixing machine 10 having a rectangular-shape hopper 11 is illustrated, inside said hopper there is a main chamber 12 where a rotor 13 is accommodated; an auxiliary chamber 14 where an upper worm 15 and a bottom worm 16 are accommodated, placed in parallel between each other and horizontally, in order to mix and grind materials accommodated inside. Said bottom worm 16 operates for moving the material longitudinally, from the machine back portion to the front portion thereof; and the upper worm 15 operates for conveying and crumbling the material to the mill part of the machine; since on the first section 17 of said worm 15, there are loops carrying the material but only up to the middle part of the machine, it is at the end of this section that said material collides with the mill discs 23 and it is offset towards the rotor 13 and at the rotor 13, this material slips actually reaching the machine back end, thus completing a mixing cycle.

Figure 5:
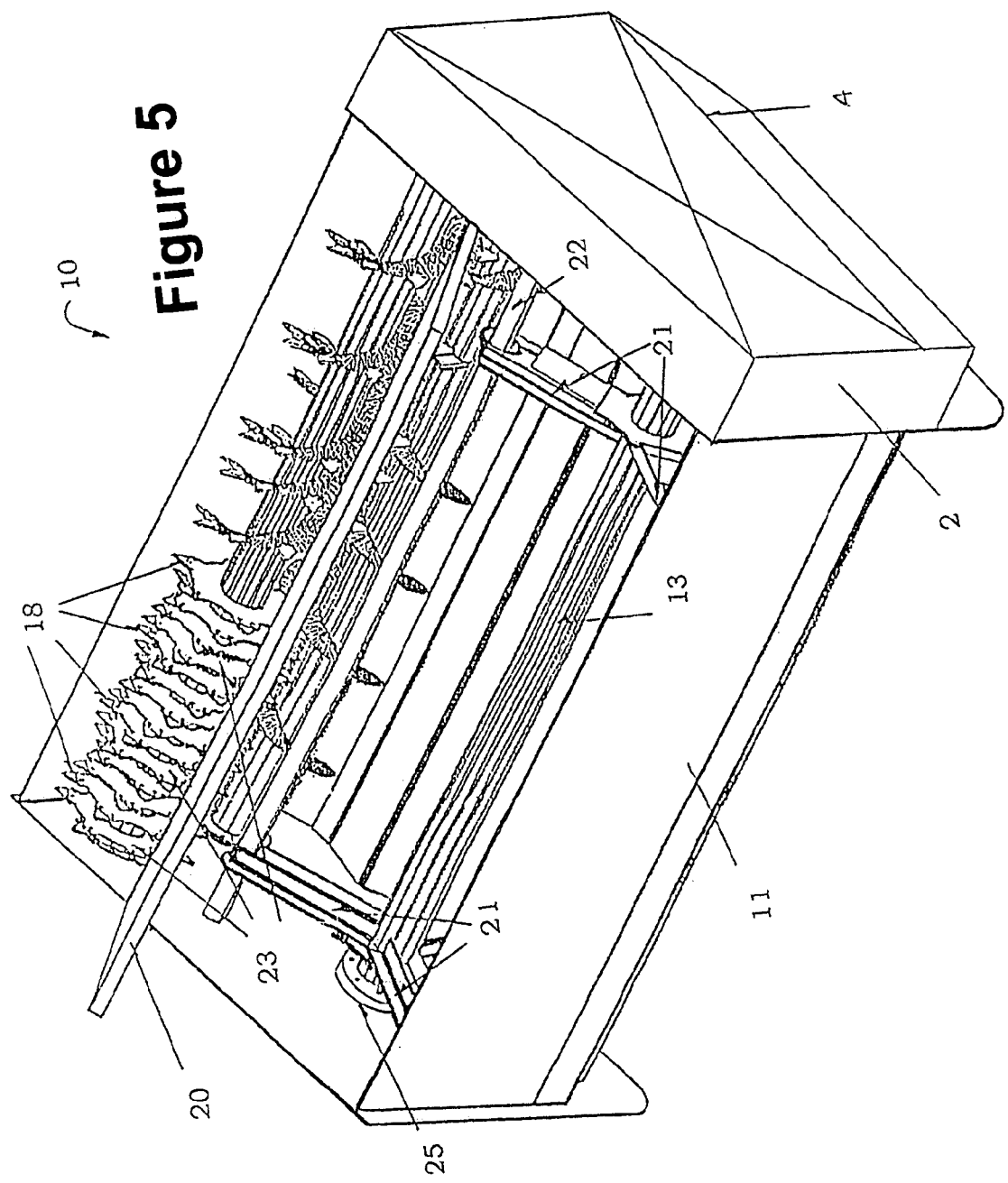
FIG. 5 is a left side perspective view of the mixing machine according to the present invention.

The upper worm 15 has also a second section, where a plurality of discs 23 is mounted (see FIGS. 1 and 5). Each disc 23 shows a plurality of exchangeable knives 18 at the external edges of said discs 23 and placed on an equidistant arrangement, forming thus a loop. On the other hand, adjacently there is a material collector chute 20, which bottom portion thereof, shows a counterplate which is comprised by a plurality of triangular-shape exchangeable knives 19 placed at the same length of said second section, said exchangeable knives 19 are fixed relative to the knives that each of the discs mounted on spiral arrangement the upper worm has, so that, when rotating the upper worm 15 at high speeds (rpm) pass through the exchangeable knives 19 grinding or crushing all material converging on.

Figure 4:
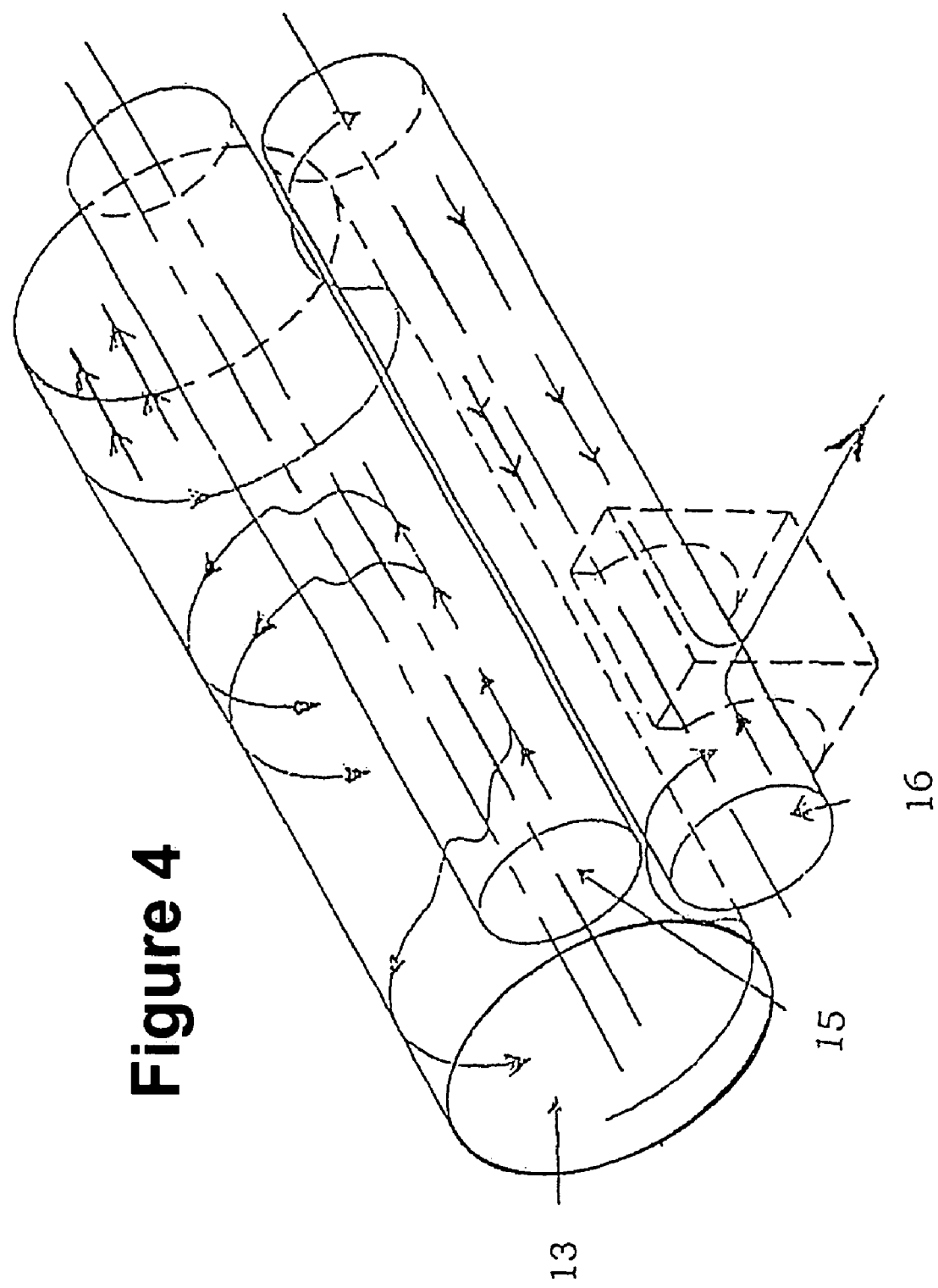
FIG. 4 is a perspective view of the flow system developed by the mixing machine of the present invention.

Referring to FIG. 4, it shows the material path when the machine is under operation, this is, materials are moving in circles and longitudinally, assuring the mixing quality.

Referring to FIG. 5, a mixing machine 10 is illustrated at the right side portion, the rotor 13 can be shown, where said rotor 13 is a fundamental part of the present invention, since thanks to the new design, it can move in circles all the material and in turn, it feeds the bottom worm 16 throughout all its length and only from the middle part backwards of said rotor 13, axially drops mixed material due to gravity. This is achieved due to the rotor spacing between holder 21 and holder 21, which attach arms 22 of the rotor 13.

Both, rotor 13 as well as upper worms 15 and bottom worms 16, are fixed to the gear systems through flanges 25, placed on each of their ends.

What is claimed is:

1. A mixing machine comprising:
   a generally rectangular-shaped hopper adapted to be mounted on a chassis and can be towed through conventional means, such as a tractor or a vehicle, the hopper having a plurality of side walls;
   rotary gear means, placed on one end of the mixing machine, for moving mixing means inside said hopper;
   a gateway disposed in at least one of the side walls of said hopper to discharge mixed materials;
   a main chamber where a rotor is placed for feeding the material to an auxiliary chamber;
   the auxiliary chamber adjacent to the main chamber; where a pair of upper and bottom worms are disposed, the upper and bottom worms being generally parallel and horizontal for mixing and optionally crushing materials, and for discharging materials through the discharge gateway;
   a materials collector chute, adjacently placed relative to the upper worm and throughout the mixing machine, wherein the upper worm includes a section, in which a plurality of discs is mounted, and which external edges thereof show exchangeable knives, where the exchangeable knives form a loop; and
   a counterplate proximate on the bottom of the materials collector chute, the counterplate comprising a plurality of exchangeable triangular-shape knives arranged adjacent said section of the upper worm, so when said upper worm rotates, the knives of the upper worm discs pass through said counterplate knives, grinding or crushing material passing through; and wherein the rotor includes axially spaced holders extending radially outward to support rotor arms when said rotor rotates, the rotor moves the material by feeding the bottom worm and at the same time dropping material via gravity.

2. The mixing machine according to claim 1, wherein the knives of the counterplate are fixed relative to the knives of the discs mounted on the upper worm.

3. The mixing machine according to claim 1, wherein when bottom worm is rotating, the material is moving in a longitudinal path, from the back portion of the machine to the front portion thereof.

4. The mixing machine according to claim 1, wherein when upper worm is rotating, it moves the material in a longitudinal path towards the back portion of the machine.

* * * * *